United States Patent [19]
Komori

[11] Patent Number: 5,699,239
[45] Date of Patent: Dec. 16, 1997

[54] POWER SUPPLY CONTROL CIRCUIT

[75] Inventor: Chihiro Komori, Tokyo, Japan

[73] Assignee: Oki Data Corporation, Tokyo, Japan

[21] Appl. No.: 756,561

[22] Filed: Nov. 26, 1996

[30] Foreign Application Priority Data

Dec. 6, 1995 [JP] Japan .................................. 7-344822

[51] Int. Cl.$^6$ .................................................. H02M 3/335
[52] U.S. Cl. ............................. 363/21; 363/56; 363/132
[58] Field of Search .................................. 363/15, 20, 16, 363/21, 37, 56, 98, 132

[56] References Cited

U.S. PATENT DOCUMENTS

| | | | |
|---|---|---|---|
| 3,859,583 | 1/1975 | Reed | 321/2 |
| 4,920,246 | 4/1990 | Aoki | 219/10.55 B |
| 5,123,746 | 6/1992 | Okado | 363/37 |
| 5,583,751 | 12/1996 | Nakazawa et al. | 363/20 |
| 5,600,500 | 2/1997 | Cook, II | 363/50 |

Primary Examiner—Adolf Berhane
Attorney, Agent, or Firm—Rabin, Champagne & Lynt, P.C.

[57] ABSTRACT

A power supply supplies an a-c power as primary electric power and a d-c power as secondary electric power. A converter converts the primary electric power, for example, 100 VAC into the secondary electric power, for example, +5 VDC and +24 VDC. The primary electric power is used to heat, for example, a heat roller of a printer. An abnormal-temperature detector outputs a detection signal when the temperature of the heat roller heated by the primary electric power exceeds a predetermined temperature. A controller causes the converter to draw an additional current from the primary electric power in response to the detection signal so that a current drawn from the primary electric power exceeds a predetermined current. An abnormal current interrupter shuts down the current drawn from the primary electric power when the current drawn from the primary electric power exceeds the predetermined current. The power supply may have an abnormal current detector instead of the abnormal-temperature detector. The abnormal current detector outputs a detection signal when a current supplied to the heat roller continues to flow longer than a predetermined period, and outputs a detection signal. The controller causes the converter to draw an additional current from the primary electric power in response to the detection signal so that a current drawn from the primary electric power exceeds a predetermined current.

16 Claims, 8 Drawing Sheets

POWER SUPPLY CONTROL CIRCUIT

BACKGROUND OF THE INVENTION

The present invention relates to a power supply circuit, and more particularly to control over the operation of a power supply circuit in accordance with the temperature of an apparatus to which the power supply circuit supplies electric power.

Conventionally, the operation of the power supply circuit is controlled in accordance with the temperature of a predetermined part in an apparatus or a unit to which electric power is supplied. One such apparatus is an electrophotographic printer in which toner is fused to fix an image on the print paper. The electrophotographic printer employs a heat roller which applies a pressure on the paper and fuses the toner on the paper. The heat roller incorporates a halogen lamp therein which heats the heat roller from inside. A thermistor is disposed in proximity to the surface of the heat roller so as to detect the temperature of the heat roller and control the heating of the heat roller in accordance with the detected temperature. A thermostat is also provided in order to shut down electric power when the heat roller is heated to an abnormally high temperature for some reason.

The power supply circuit receives primary electric power of, for example, 100 VAC and outputs secondary electric power. The power supply circuit also directly supplies the primary electric power to the halogen lamp. A triac is connected in series with the halogen lamp, and opens and closes the current path of the current to the halogen lamp in accordance with the temperature of the heat roller, thereby maintaining the heat roller at a substantially constant temperature. The aforementioned thermostat is in series with the triac and forcibly opens the current path when the heat roller is heated to an abnormally high temperature, shutting down electric power to the halogen lamp.

With the aforementioned conventional power supply circuit, a rush current flowing through the triac due for example, a lightning surge, causes the triac to close so that a current flows to the halogen lamp. The triac may recover to its open condition after the surge disappears if the lightning surge is relatively small. However, if the lightning surge is large, the triac is permanently damaged so that the triac can not return to its open condition. The triac remains closed after the lighting surge disappears, being unable to turn on and turn off the current to the halogen lamp. This causes the temperature of the heat roller to continue to rise to a very high temperature at which the thermostat is designed to shut down the current. The thermostat is usually designed to open the circuit at a considerably higher temperature than the normal temperature of the heat roller and therefore it takes some time before the temperature of the heat roller reaches such a high temperature. As a result, the print paper in contact with the heat roller is carbonized before the thermostat opens the current path.

SUMMARY OF THE INVENTION

An object of the invention is to provide a power supply circuit where primary electric power is shut down promptly when the temperature of an apparatus heated by the primary electric power rises to an abnormally high temperature.

An object of the invention is to provide a power supply circuit where primary electric power is shut down promptly when a current supplied from the primary electric power to an apparatus heated by the primary power continues to flow longer than a predetermined period.

A converter converts primary electric power, for example, 100 VAC into secondary electric power, for example, +5 VDC and +24 VDC. The primary electric power is also used to energize, for example, a heat roller of a printer. An abnormal-temperature detector outputs a detection signal when the temperature of the heat roller energized by the primary electric power exceeds a predetermined temperature. A controller causes the converter to draw an additional current from the primary electric power in response to the detection signal so that a current drawn from the primary electric power exceeds a predetermined current. A current interrupter shuts down the current drawn from the primary electric power when the current drawn from the primary electric power exceeds the predetermined current.

The power supply may have an abnormal-current detector instead of the abnormal-temperature detector. The abnormal-current detector outputs a detection signal when a current supplied from the primary electric power to the heat roller continues to flow longer than a predetermined period. The controller causes the converter to draw an additional current from the primary electric power in response to the detection signal so that a current drawn from the primary electric power exceeds the predetermined current. The current interrupter shuts down the current drawn from the primary electric power when the current drawn from the primary electric power exceeds the predetermined current.

DETAILED DESCRIPTION OF THE INVENTION

Figure 1:
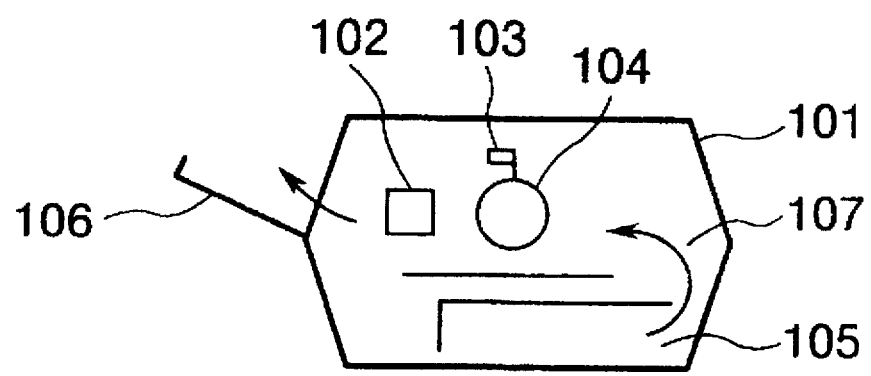
FIG. 1 illustrates a general construction of an electrophotographic printer.

FIG. 1 illustrates a general construction of an electrophotographic printer to which the power supply according to the present invention supplies electric power. A paper tray 105 is disposed in the printer body 101 and holds a print medium such as paper. A hopping roller, not shown, feeds the print medium sheet by sheet into a medium path 107. The print medium is then transported by medium transporting means along the medium path 107 in a direction shown by an arrow. The print medium is transported to a predetermined print area where information is printed on the print medium and then the printed medium is delivered to an exit stacker 106.

Provided in the aforementioned print area are an LED head 103, photosensitive drum 104, and fixing device 102. The LED head 103 illuminates the photosensitive drum 104 to form an electrostatic latent image on the surface of the photosensitive drum 104. Then, a developing device, not shown, applies toner to the electrostatic latent image to develop a toner image on the photosensitive drum 104. The toner image is then transferred to the print medium when the print medium comes into contact with the photosensitive drum 104. Finally, the fixing device 102 heats the toner particles adhering to the print medium as the print medium passes the fixing device 102, fixing the toner image by fusing the toner particles.

Figure 2:
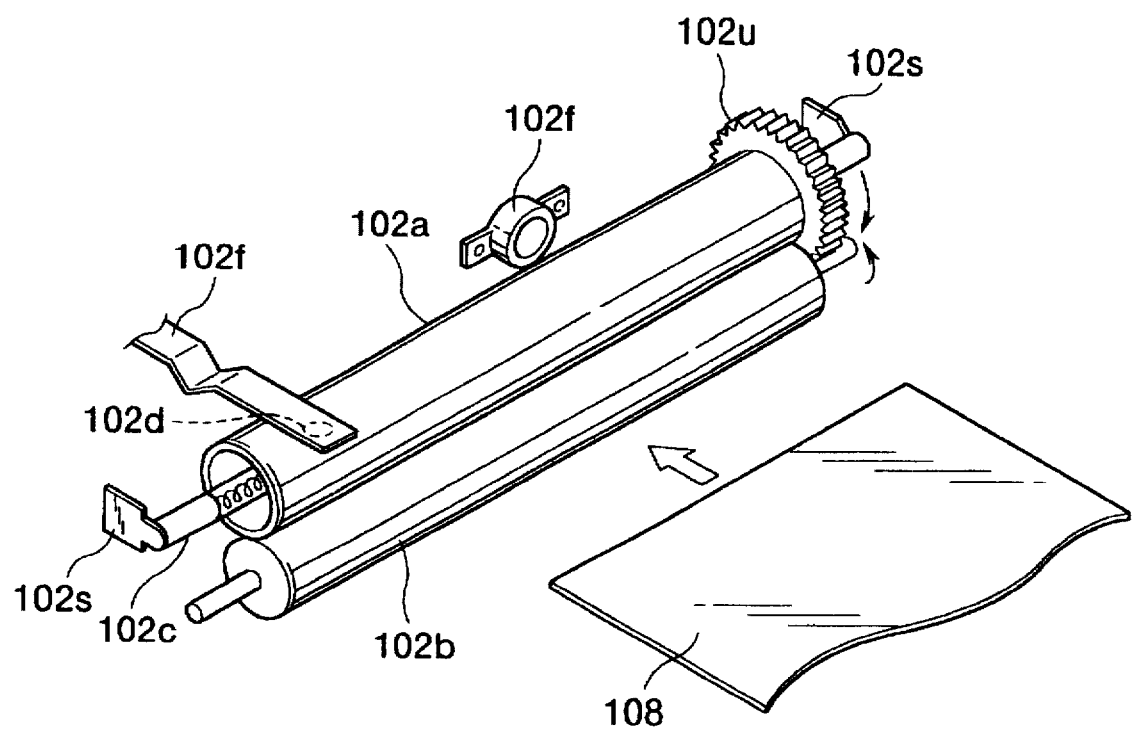
FIG. 2 is a perspective view of the fixing device of the electrophotographic printer, showing the detail of the pertinent portions.

FIG. 2 is a perspective view of the fixing device 102 showing the detail of the pertinent portions thereof. A heat roller 102a and a back-up roller 102b in pressure contact with the heat roller 102a rotate in directions shown by arrows to transport the print medium 108 therebetween, and the heat roller 102a heats toner particles on the print medium 108 to fuse the toner particles. A halogen lamp 102c extends through the heat roller 102a and heats the heat roller 102a. The halogen lamp 102c is supported at longitudinally opposed ends thereof by lamp brackets 102s and is electrically connected to the 100 VAC primary electric power. The heat roller 102a is driven in rotation via a drive gear 102u. A thermistor 102d is supported by a thermistor bracket 102t and detects the surface temperature of the heat roller 102a.

The resistance of the thermistor 102d decreases with increasing temperature of the heat roller. The voltage across the thermistor 102d is fed back to the power supply circuit, so that the current supplied to the halogen lamp 102c is turned on and off in accordance with the detected temperature, thereby maintaining the temperature of the heat roller 102a at substantially the same temperature. A thermostat 102f detects an abnormally high temperature of the heat roller 102a to shut down the current supplied to the halogen lamp 102c when the power supply is unable to control the current to the halogen lamp.

First embodiment

Figure 3:
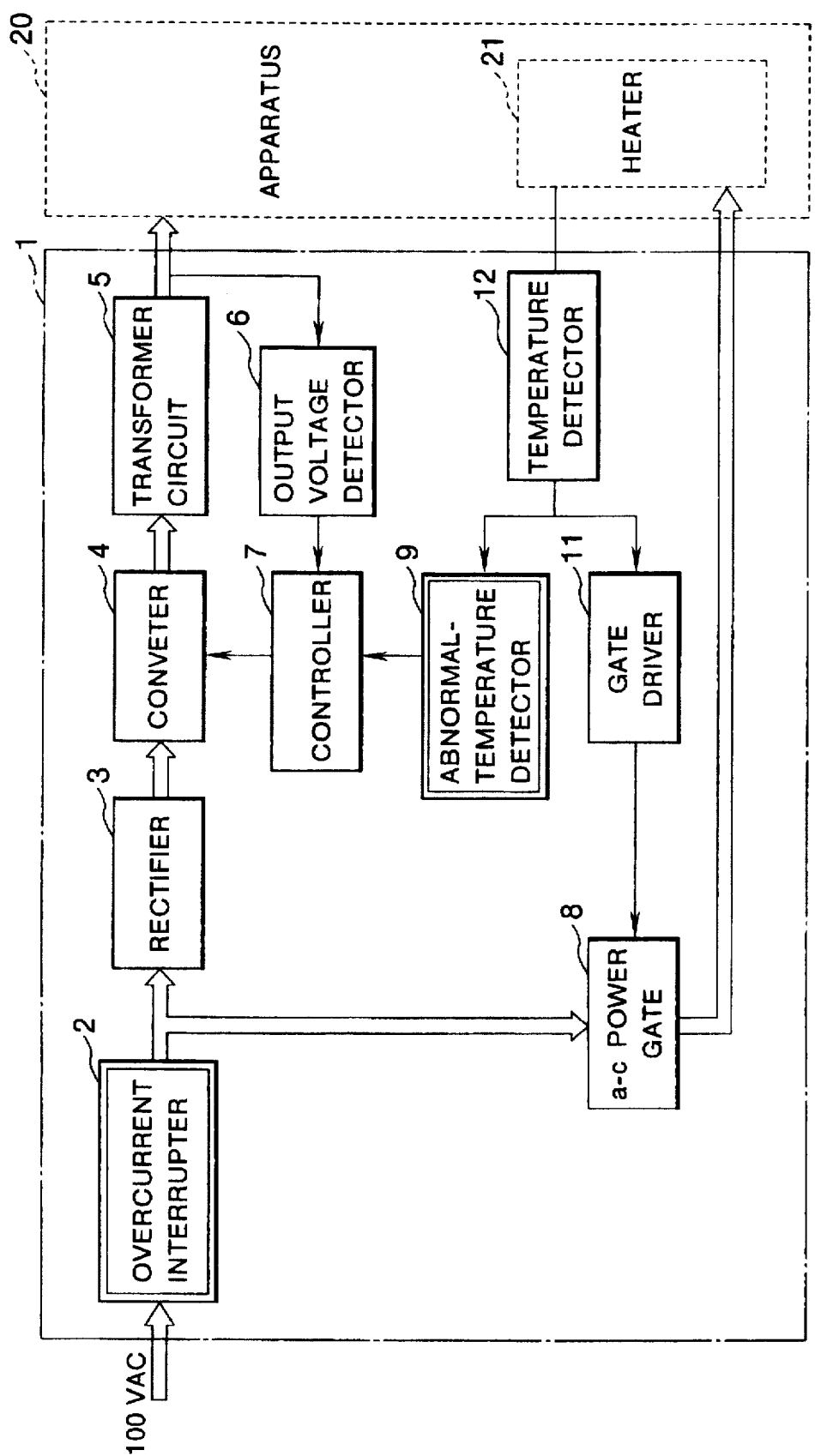
FIG. 3 is a block diagram of a power supply circuit according to a first embodiment.

FIG. 3 is a block diagram of a power supply circuit 1 according to a first embodiment of the invention. The power supply circuit 1 receives primary electric power of, for example, 100 VAC from the main line and converts the primary electric power into secondary electric power. The secondary electric power is supplied to motors and electronic circuits in an apparatus 20 in the form of, for example, an electrophotographic printer as shown in FIGS. 1 and 2. The power supply circuit 1 also supplies the primary electric power to a heater 21 in the apparatus 20.

A rectifier 3 rectifies the primary electric power of 100 VAC supplied through an overcurrent interrupter 2, and outputs a d-c voltage. A converter 4 takes the form of for example, a chopper, and cooperates with a transformer circuit 5 to pulse-width modulate the d-c voltage outputted from the rectifier 3 into chopped voltages. The pulse-width-modulated d-c voltage is smoothed out by the transformer circuit 5 into d-c voltages such as +24 VDC and +5 VDC used in the external apparatus 20. For example, +5 VDC is used to power the IC circuits which require a closely controlled supply voltage. Therefore, the output voltage detector 6 monitors the +5 VDC voltage and outputs voltage errors. The controller 7 changes the duty cycle in the PWM control of the converter 4 in accordance with the output voltage errors to stabilize the +5 VDC voltage. A temperature detector 12 detects the temperature of the heater 21 in the apparatus 20. A gate driver 11 drives an a-c power gate 8 to pass and not to pass the 100 VAC primary electric power to the heater 21 in the apparatus 20, depending on the output of the temperature detector 12 so that the temperature of the heater 21 is maintained at a desired temperature. The output of the temperature detector 12 is also checked by the abnormal-temperature detector 9 to determine whether the temperature of the heater 21 is above a threshold temperature. If the temperature exceeds the threshold temperature higher than the desired temperature, then the controller 7 causes the duty cycle of the converter 4 to increase to 100% so that the overcurrent interrupter 2 operates to shut down the primary electric power.

Figure 4:
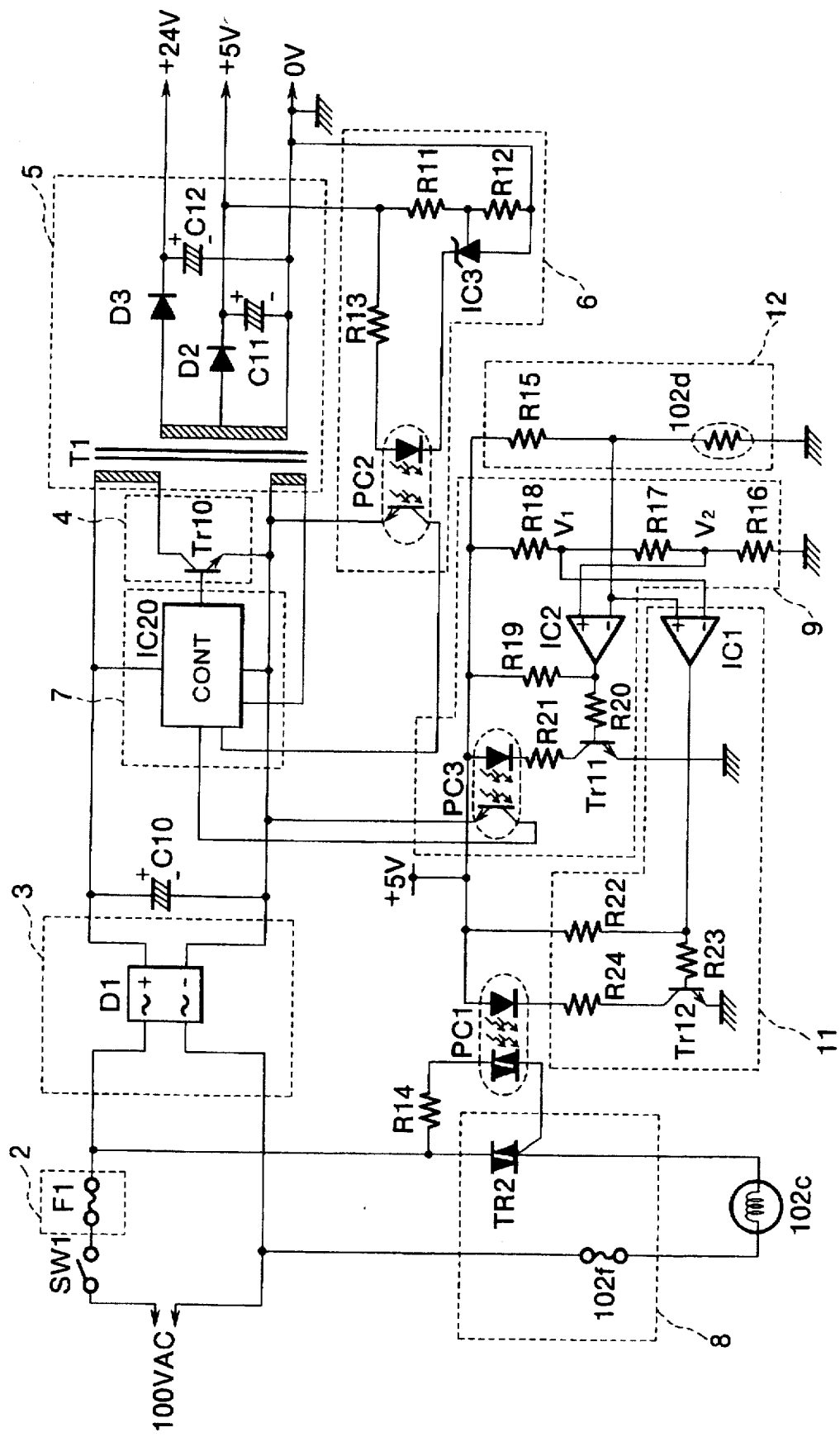
FIG. 4 shows a schematic diagram of the power supply circuit according to the first embodiment.

FIG. 4 is a schematic diagram of the aforementioned power supply circuit 1. A fuse F1 forms the overcurrent interrupter 2. The fuse F1 may be replaced by, for example, a circuit breaker. The rectifier 3 takes the form of a diode bridge D1. The converter 4 takes the form of a transistor Tr10 and the transformer circuit 5 includes a transformer T1, diodes D2–D3, and capacitors C11–C12. The output voltage detector 6 includes resistors R11–R13, shunt regulator IC3, and photo coupler PC2. The controller 7 takes the form of a power supply controller IC20. The a-c power gate 8 includes the triac TR2 and thermostat 102f. The temperature detector 12 includes the thermistor 102d and resistor R15. The abnormal-temperature detector 9 includes a comparator IC2, resistors R16–R21, transistor Tr11, and photo coupler PC3. The gate driver 11 includes a comparator IC1, resistors R22–R24, and transistor Tr12.

Figure 5:
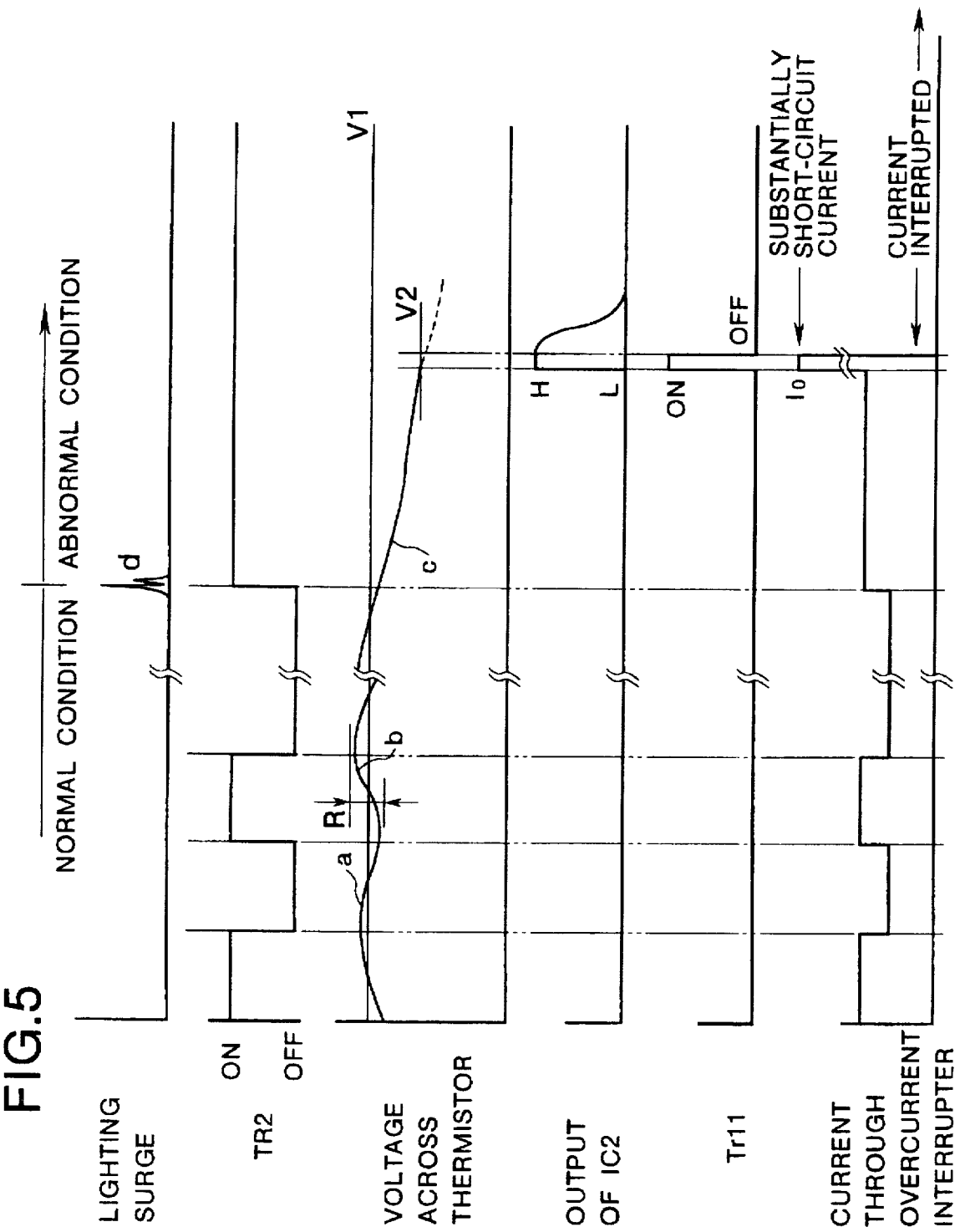
FIG. 5 is a timing chart showing the relationship among the waveforms of relevant portions in FIG. 4.

The normal operation of the power supply circuit 1 shown in FIG. 4 will now be described in detail. FIG. 5 illustrates waveforms of relevant parts in FIG. 4. The primary electric power of 100 VAC is full-wave rectified by the diode D1 into a ripple voltage which is then smoothed out by a capacitor C10. The power supply controller IC20 controls the transistor Tr10 to turn on and off so as to PWM-modulate the voltage smoothed out by the capacitor C10. The PWM-modulated voltage is then converted by the transformer T1 into two lower voltages. One of the lower voltages is rectified by the diode D2 and smoothed out by the capacitor C12 into +24 VDC, and the other rectified by the diode D3 and smoothed out by the capacitor C11 into +5 VDC. The +5 VDC voltage drives ICs and LSIs in the apparatus 20 and therefore must be very closely regulated. The shunt regulator IC3 detects increases and decreases in the +5V voltage due to decreases and increases in load current flowing into the ICs and LSIs, and causes the photo coupler PC2 to control the power supply controller IC20 which in turn changes the duty cycle in the PWM control within a predetermined range, thereby minimizing variations in +5 VDC voltage.

The resistance of the thermistor 102d decreases with increasing temperature of the heat roller 102a heated by the halogen lamp 102c which serves as the heater 21 in FIG. 1. Thus, higher voltages across the thermistor 102d indicate lower temperatures of the heat roller 102a and lower voltages represent higher temperatures. The comparator IC1 receives the voltage across the thermistor 102d and a reference voltage V1. When the voltage across the thermistor 102d is higher than a reference voltage V1, the comparator IC1 outputs a high level which in turn drives the transistor Tr12 to conduct. Then, the transistor Tr12 causes the photo triac PC1 to drive the triac TR2 into conduction, thus energizing the halogen lamp 102c. The temperature of the heat roller 102a then begins to increase, i.e., the voltage across the thermistor 102d begins to decrease gradually as depicted by a in FIG. 5.

When the voltage across the thermistor 102d is lower than the reference voltage V1, the comparator IC1 outputs a low level which does not drive the transistor Tr12 to conduct. Thus, the photo triac PC1 does not conduct, leaving the triac TR2 open. Thus, the halogen lamp 102c is not energized. The temperature of the heat roller 102a then begins to decrease, i.e., the voltage of the thermistor 102d begins to gradually increase as depicted by b in FIG. 5. In this manner, the halogen lamp 102c is controlled to turn on and off, maintaining the heat roller 102a within a predetermined temperature range R.

The comparator IC2 in the abnormal-temperature detector 9 receives a reference voltage V2 and the voltage across the thermistor representative of the temperature of the heat roller 102a. The reference voltage V2 is selected such that the reference voltage V2 indicates a higher temperature than the reference voltage V1. Thus, when the gate driver 11 controls the triac TR2 to turn on and off, the comparator IC2 outputs only a low level since the voltage across the thermistor 102d is higher than the reference voltage V2, and therefore the transistor Tr11 will not turn on. As a result, the power supply controller IC20 controls the duty cycle of the transistor Tr10 only in accordance with the output of the photo coupler PC2 to provide well regulated d-c voltages to the apparatus 20.

Let's assume that an abnormal condition occurs, for example, a lightning surge d destroys the triac TR2 with the result that the triac TR2 is short-circuited to remain closed. As a result, the a-c current from the primary electric power continues to flow through the halogen lamp 102c, increasing the temperature of the heat roller 102a to an abnormally high value. Therefore, the voltage across the thermistor 102d continues to decrease as depicted by c in FIG. 5 toward the reference voltage V2. When the voltage across the thermistor 102d decreases below the reference voltage V2, the comparator IC2 outputs a high level to turn on the transistor Tr11 which in turn causes the photo coupler PC3 to turn on so that the power supply controller IC20 sets the duty cycle of the transistor Tr10 to 100%. The 100% duty cycle causes the transistor Tr10 to be practically short-circuited with the result that the diodes D1 draws a very large current as depicted by Io in FIG. 5 through the fuse F1. The very large current Io causes the fuse F1 to blow out, interrupting the a-c current supplied to the halogen lamp 102c. Thus, the heat roller 102a is freed from the overheated condition.

The output of the comparator IC2, i.e., detection signal, may also be directed to a printer-controlling circuit, not shown, in the electrophotographic printer 20, so that the printer-controlling circuit may stop feeding of the print medium such as paper and promptly discharge the printed medium currently under printing operation to the exit stacker 106. An alarm may be provided which appears on the operating panel, not shown, to indicate to the operator that the heat roller 102a has been heated to an abnormally high temperature.

Second embodiment

Figure 6:
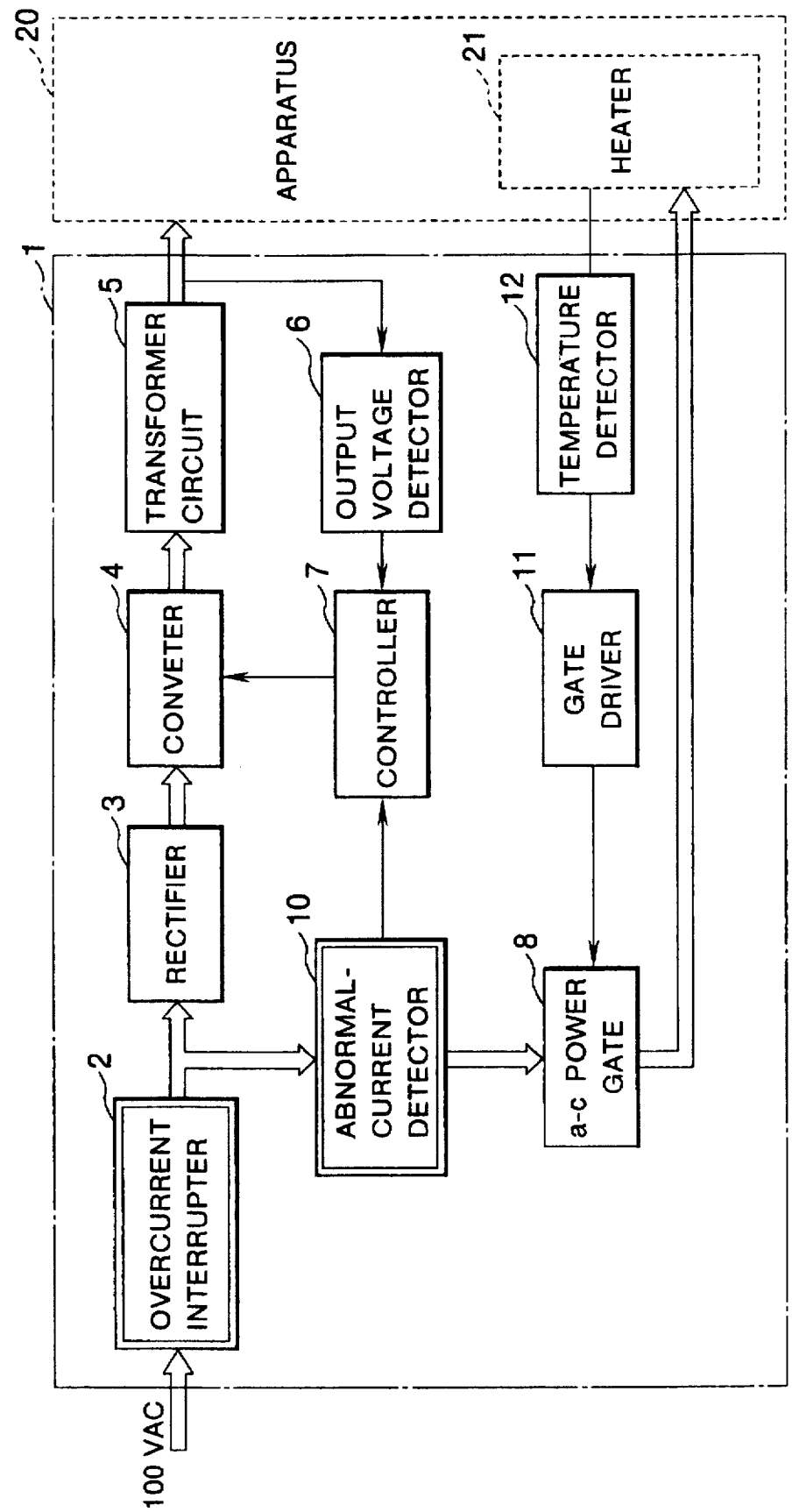
FIG. 6 is a block diagram of a power supply circuit according to a second embodiment.

FIG. 6 is a block diagram showing a power supply circuit according to a second embodiment. The basic construction is the same as that of the first embodiment. The second embodiment differs from the first embodiment in that an abnormal-current detector 10 is provided instead of the abnormal-temperature detector 9. The second embodiment operates in the same way as the first embodiment in the normal operation. Therefore, the protection against an abnormal condition will primarily be described with respect to the abnormal-current detector 10.

Referring to FIG. 6, the temperature detector 12 detects the temperature of the heater 21 in the apparatus 20. A gate driver 11 drives the a-c power gate 8 to pass and not to pass the 100 VAC primary electric power to the heater 21 in the apparatus 20, depending on the output of the temperature detector 12 so that the temperature of the heater 21 is maintained within a predetermined range. The abnormal current detector 10 detects and informs the controller 7 if the a-c current continues to flow to the apparatus 20 longer than a predetermined time period. The controller 7 in turn sets the duty cycle of the converter 4 to 100%. The 100% duty cycle causes the converter 4 to be practically short-circuited, resulting in a very large current drawn by the converter 4 from the primary electric power through the overcurrent interrupter 2. In response to the very large current, the overcurrent interrupter 2 shuts down the a-c current supplied to the apparatus 20, protecting the apparatus 20 against fatal damages.

Figure 7:
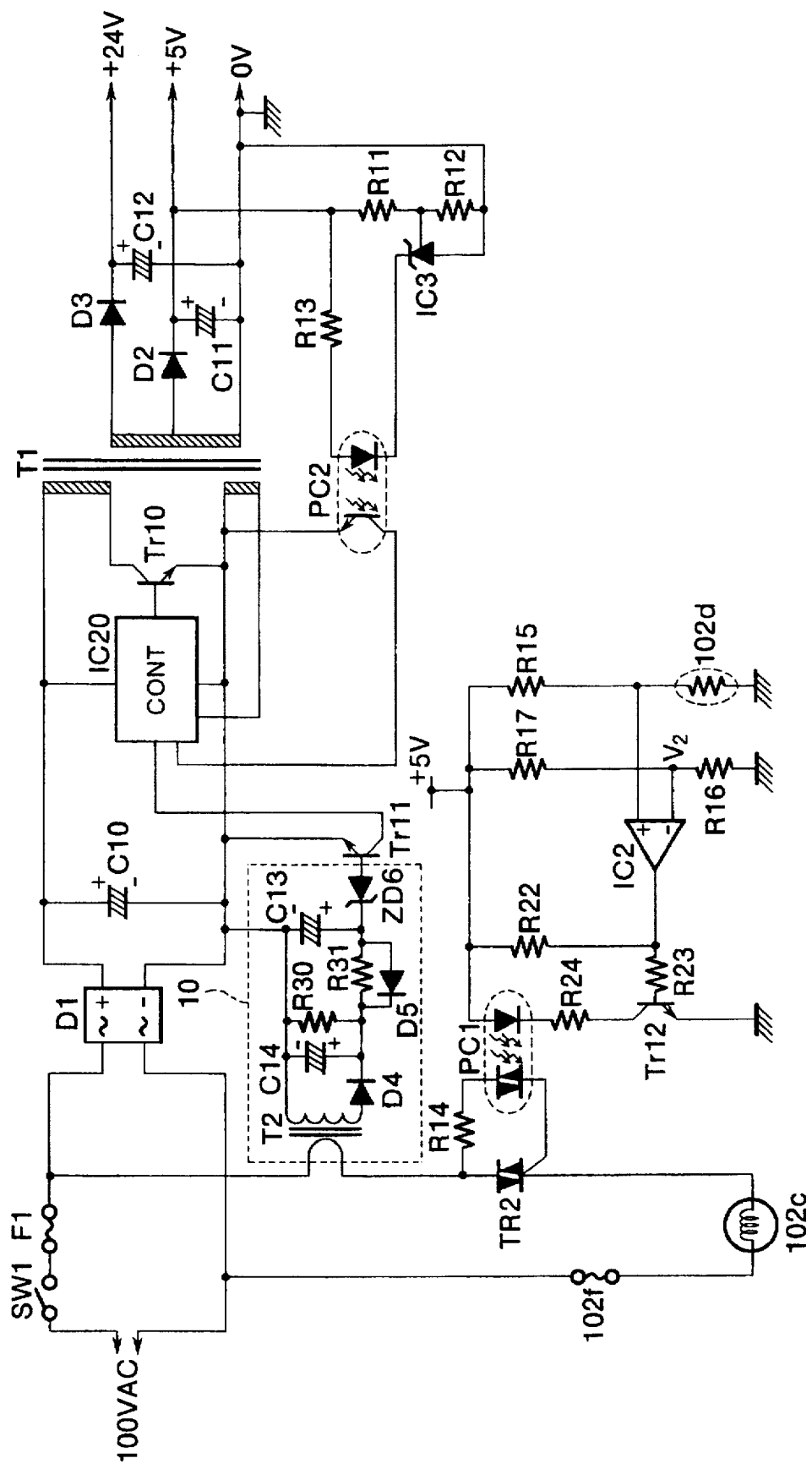
FIG. 7 is a schematic diagram of the power supply circuit according to the second embodiment.
Figure 8:
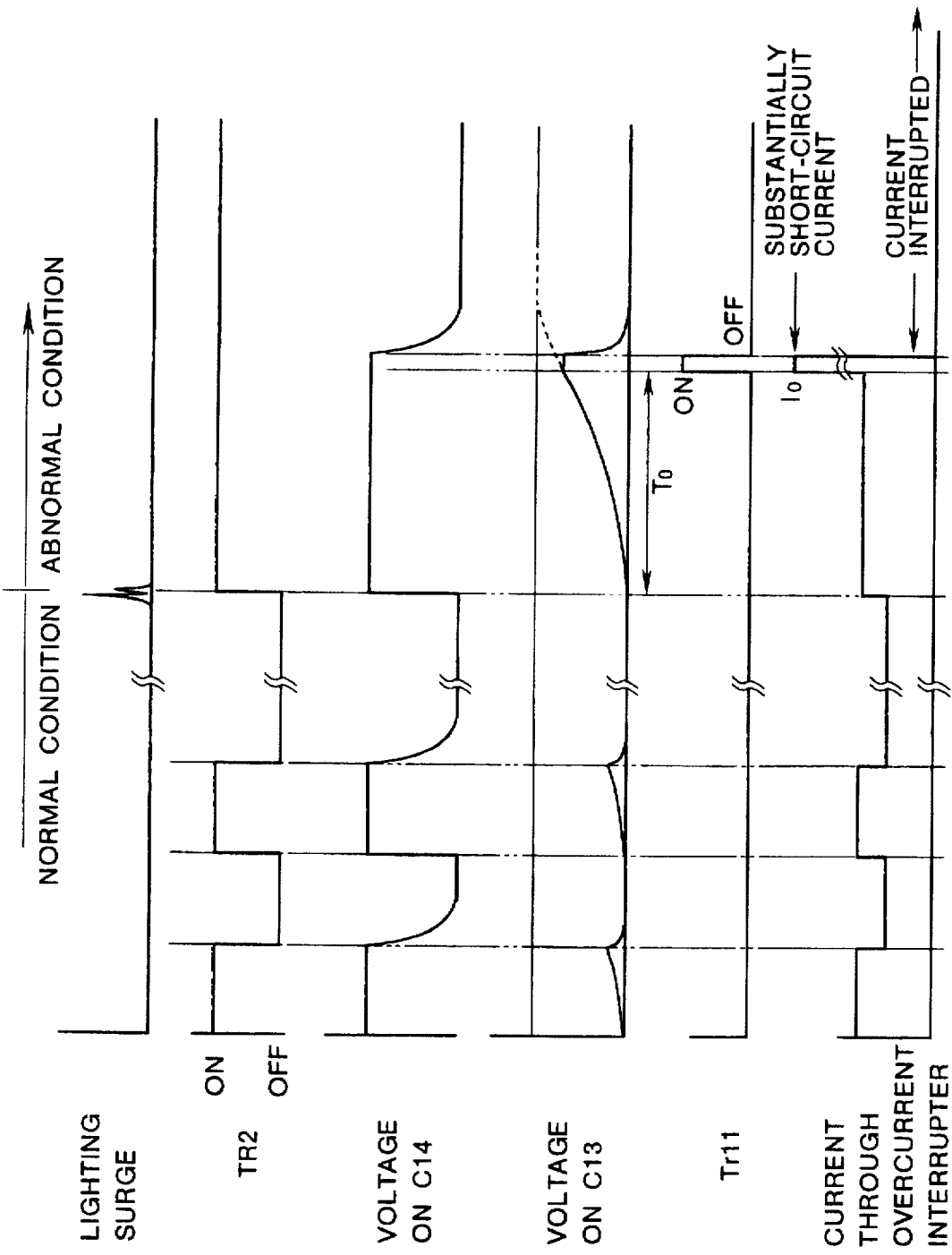
FIG. 8 is a timing chart showing the relationship among the waveforms of relevant portions in FIG. 7.

FIG. 7 is a schematic diagram of the power supply circuit 1 according to the second embodiment. FIG. 7 differs from FIG. 4 only in that the abnormal-current detector 10 is provided in place of the abnormal-temperature detector 9. FIG. 8 is a timing chart showing the relationship among the waveforms of relevant parts in FIG. 7. The construction and operation of the abnormal current detector 10 will be described in detail with reference to FIGS. 7 and 8. The abnormal current detector 10 includes a current transformer T2, resistors R30–R31, capacitors C13–C14, diodes D4–D5, and zener diode ZD6.

When the power supply circuit 1 is normally operating to supply an a-c current to the halogen lamp 102c which serves as the heater 21 in FIG. 3, a voltage is induced in the secondary winding of the current transformer T2. The secondary voltage is rectified by the diode D4 and smoothed out by the capacitor C14 as shown in FIG. 8. When the halogen lamp 102c is energized, the voltage on the capacitor C14 charges the capacitor C13 practically through the resistor R31 since the diode D5 has a reverse resistance much higher than the R31. When the halogen lamp 102c is not energized, the voltage on the capacitor C13 is discharged practically through the diode D5 since the diode D5 has a forward resistance much lower than the R31. Thus, the capacitor C13 discharges faster than it is charged. The voltage across the capacitor C13 rises to a certain value while the a-c current is cycled on and off during the normal operation but will not increase to a value high enough to turn on the transistor Tr11. Therefore, the transistor Tr11 will never conduct.

When an abnormal condition occurs, for example, a lightning surge causes the triac TR2 to be short-circuited, so that the a-c current continues to flow through the halogen lamp 102c. The voltage on the capacitor C14 continues to charge the capacitor C13 so that the voltage of the capacitor C13 increases to a voltage high enough to supply a sufficient base current through the zener diode ZD6 into the base of the transistor Tr11. Thus, the transistor Tr11 turns on. Once the transistor Tr11 is turned on, the power supply controller IC20 sets 100% duty cycle to the transistor Tr10. The 100% duty cycle causes the transistor Tr10 to conduct longer than the normal duty cycle so that the output of the diode D1 is practically short-circuited to draw an excessively large a-c current through the fuse F1 from the primary electric power. The fuse F1 therefore blows out due to the excessively large current, shutting down the a-c current to the halogen lamp 102c.

What is claimed is:

1. A power supply, comprising:

a converter for converting primary electric power into secondary electric power;

an abnormal-temperature detector for outputting a detection signal when a temperature of an external apparatus heated by said primary electric power exceeds a predetermined temperature;

a controller for causing said converter to draw an additional current from said primary electric power in response to said detection signal so that a current drawn from said primary electric power exceeds a predetermined current; and a current interrupter for shutting down the current drawn from said primary electric power when the current drawn from said primary electric power exceeds said predetermined current.

2. The power supply according to claim 1, wherein the current drawn from said primary electric power exceeding said predetermined current is substantially equal to a short-circuit current.

3. The power supply according to claim 1, wherein said current interrupter is a fuse which blows to protect the external apparatus when a current flowing through the fuse exceeds a load current required for a normal operation of the external apparatus, said additional current being drawn through the fuse in response to said detection signal so that the fuse blows to shut down the current drawn from said primary electric power.

4. The power supply according to claim 1, wherein said abnormal-temperature detector includes a thermistor for outputting a voltage indicative of a temperature of the apparatus, a comparator for comparing said voltage outputted from said thermistor with a reference voltage to output a signal indicative that the temperature of the apparatus is higher than said predetermined temperature.

5. A power supply, comprising:

a converter for converting primary electric power into secondary electric power;

an abnormal current detector for detecting when a current supplied to an external apparatus continues to flow longer than a predetermined period, and for outputting a detection signal indicating that said current supplied to the apparatus continues to flow longer than the predetermined period;

a controller for causing said converter to draw an additional current from said primary electric power in response to said detection signal so that a current drawn from said primary electric power exceeds a predetermined current; and a current interrupter for shutting down the current drawn from said primary electric power when the current drawn from said primary electric power exceeds said predetermined current.

6. The power supply according to claim 5, wherein the current drawn from said primary electric power exceeding said predetermined current is substantially equal to a short-circuit current.

7. The power supply according to claim 5, wherein said abnormal current detector includes a current transformer inserted in a current path of said current supplied to the external apparatus, a rectifier for rectifying an output of said current transformer, and a time constant circuit for storing an output of said rectifier and outputting said detection signal when said output of said rectifier reaches to a predetermined value.

8. The power supply according to claim 5, wherein said current interrupter is a fuse which blows to protect the external apparatus when a current flowing through the fuse exceeds a load current required for a normal operation of the external apparatus, said additional current being drawn through the fuse in response to said detection signal so that the fuse blows to shut down the current drawn from said primary electric power.

9. A power supply for supplying an electric power to a printer having a heating element energized by primary electric power supplied to the power supply and a heat roller heated by the heating element, the power supply comprising:

a converter for converting the primary electric power into secondary electric power;

an abnormal-temperature detector for outputting a detection signal when a temperature of an external apparatus heated by said primary electric power exceeds a predetermined temperature;

a controller for causing said converter to draw an additional current from said primary electric power in response to said detection signal so that a current drawn from said primary electric power exceeds a predetermined current; and a current interrupter for shutting down the current drawn from said primary electric power when the current drawn from said primary electric power exceeds said predetermined current.

10. The power supply according to claim 9, wherein the current drawn from said primary electric power exceeding said predetermined current is substantially equal to a short-circuit current.

11. The power supply according to claim 9, wherein said current interrupter is a fuse which blows to protect the external apparatus when a current flowing through the fuse exceeds a load current required for a normal operation of the external apparatus, said additional current being drawn through the fuse in response to said detection signal so that the fuse blows to shut down the current drawn from said primary electric power.

12. The power supply according to claim 9, wherein said abnormal temperature detector includes a thermistor for outputting a voltage indicative of a temperature of the apparatus, a comparator for comparing said voltage outputted from said thermistor with a reference voltage to output a signal indicative that the temperature of the apparatus is higher than said predetermined temperature.

13. A power supply for supplying an electric power to a printer having a heating element energized by primary electric power supplied to the power supply and a heat roller heated by the heating element, the power supply comprising:

a converter for converting the primary electric power into secondary electric power;

an abnormal current detector detecting when a current supplied to the heating element continues to flow longer than a predetermined period, and for outputting a detection signal indicative of said current supplied to the heating element continues to flow longer than said predetermined period;

a controller for causing said converter to draw an additional current from said primary electric power in response to said detection signal so that a current drawn from said primary electric power exceeds a predetermined current; and a current interrupter for shutting down the current drawn from said primary electric power when the current drawn from said primary electric power exceeds said predetermined current.

14. The power supply according to claim 13, wherein the current drawn from said primary electric power exceeding said predetermined current is substantially equal to a short-circuit current.

15. The power supply according to claim 13, wherein said current interrupter is a fuse which blows to protect the external apparatus when a current flowing through the fuse exceeds a load current required for a normal operation of the external apparatus, said additional current being drawn through the fuse in response to said detection signal so that the fuse blows to shut down the current drawn from said primary electric power.

16. The power supply according to claim 13, wherein said abnormal current detector includes a current transformer inserted in a current path of said current supplied to the external apparatus, a rectifier for rectifying an output of said current transformer, and a time constant circuit for storing an output of said rectifier and outputting said detection signal when said output of said rectifier reaches to a predetermined value.

* * * * *